United States Patent Office 2,940,832
Patented June 14, 1960

2,940,832
METHOD FOR SYNTHESIZING CHROMIUM HEXACARBONYL

Giulio Natta, Raffaele Ercoli, and Fausto Calderazzo, all of 18 Via F. Turati, Milan, Italy No Drawing. Filed Jan. 28, 1958, Ser. No. 711,548

Claims priority, application Italy Feb. 4, 1957

19 Claims. (Cl. 23—203)

This invention relates to an improved process for preparing chromium hexacarbonyl.

It is known (A. Job and A. Cassal, 1926) to synthesize chromium hexacarbonyl by reacting, at atmospheric or higher pressures, carbon monoxide with a suspension of anhydrous chromium trichloride in anhydrous ethyl ether containing a Grignard reagent such as, e.g., phenyl magnesium or ethyl magnesium bromide. The reaction is generally carried out at temperatures below room temperature and usually at temperatures between —70° C. and +10° C., using a Grignard reagent to chromium trichloride molar ratio much higher than 1.

It has been reported (B. B. Owen et al., Jr. Amer. Chem. Soc. 69, 1723, 1947) that in small scale experiments, small amounts of crude chromium hexacarbonyl (yields about 60% calculated on chromium) were obtained by reacting together anhydrous chromium trichloride, carbon monoxide under 50 atm. pressure, and phenyl magnesium bromide, the latter being used in a molar ratio higher than 5:1 with respect to the chromium trichloride.

The preparation of chromium hexacarbonyl from biscyclopentadienyl chromium and carbon monoxide at 250° C. also has been reported (E. O. Fisher, Ztschrf. für Naturforschung 10b, 140, 1955).

All of these methods which, so far as applicants are aware, are the only methods reported for preparing chromium hexacarbonyl, have the disadvantage of being so expensive that they are not practical for large scale commercial use. Moreover, those methods require the use of certain specific chromium compounds such as anhydrous chromium trichloride, chromyl chloride, or biscyclopentadienyl chromium, and are therefore limited with respect to the starting material.

There is a need in the art for an economically feasible and convenient method for producing chromium hexacarbonyl, since that compound is adapted to use for various important purposes, including use as catalyst in organic synthesis or polymerization reactions, use for coating or plating metal surfaces, use as agent capable of modifying the combustion characteristics of fuel, etc.

One object of this invention is to provide a new, relatively economical and simple process for synthesizing chromium hexacarbonyl on a commercial scale.

This and other objects are accomplished by the present invention based on our discovery that certain commonly available trivalent and bivalent chromium compounds can be transformed into chromium hexacarbonyl by treatment with carbon monoxide, or mixtures of carbon monoxide with hydrogen and/or other inert gases, under pressures of 10 to 400 atm., at a temperature of 80° C. to 200° C., and in the presence of a reducing agent, an electron-donor compound, and an activator.

The starting tri- or bi-valent chromium compound may be, for instance, dry chromic acetate, chromic ethylhexanoate, trichloro-tripyridine-chromium, chromic acetylacetonate, anhydrous chromium trichloride, chromic amino-acetate, chromic xanthogenate, chromous acetate and other chromium salts or complexes, preferably in anhydrous condition.

The electron-donor may be a nitrogenous compound such as pyridine or pyridine tar bases, other preferably tertiary nitrogen bases, or ammonia.

The reducing agent may be a metal which is, preferably, more electropositive than chromium, such as zinc, magnesium, aluminum, mixtures of the metals, or alloys of the metals with each other and/or with other metals, metal hydrides, or alkyl metal hydrides.

Suitable activators for use in the process include halogens or halogen-containing compounds. The activator used in carrying out the invention may consist of the simple halogen, or of organic or inorganic compounds containing one or more halogen atoms capable of reacting with at least one of the components of the reaction mixture, under the given reaction conditions. In general, all halogenated compounds which have an acidic character according to Lewis, or which can form Lewis' acids under the reaction conditions, are suitable for use in the present method of synthesizing the chromium hexacarbonyl.

The halogenated compound may be for instance, trichloro-tripyridin-chromium, chloroform, carbon tetrachloride, elemental iodine, aluminum tribromide, copper chlorocarbonyl, iron, cobalt, or nickel halides, etc. The halogen activator is preferably employed in molar ratios of from 0.1% to 2%, referred to chromium.

Instead of using, as the starting material, anhydrous chromium compounds as mentioned hereinabove, we may use metallic chromium in powdered form and particularly as produced by electrolysis, and certain alloys of chromium with other easily attackable metals such as for example, chromium-aluminum alloys. The reaction generally proceeds more slowly when metallic chromium or the chromium alloys are used.

Diluents, such as hydrocarbons, ethers, ketones, alcohols or other solvents having the character of nitrogen bases according to Lewis, can be used in carrying out the invention. It may also be desirable, and preferred, to include in the reaction mass small amounts of preformed chromium hexacarbonyl or of other metal carbonyls or metal salts capable of being transformed into metal carbonyls under the conditions employed for effecting the reaction.

In general, the reducing metals are used in the form of shavings presenting a large surface area, or of finely divided powders. Conveniently, the reducing metal is used in an amount not lower than the amount required for the complete reduction of chromium to the zero-valent state. Since when metallic chromium powder is used and in order to transform the chromium powder into chromium hexacarbonyl it is sufficient to employ small amounts or reducing agents which function to reduce the surface coating of oxidation products on the chromium powder, alkyl metal compounds of metals more electropositive than chromium can be used as the reducing agent. Excess amounts of the reducing agent are not necessary and, in fact, if an excess thereof is used, most of it is found to be unmodified at the end of the reaction resulting in production of the chromium hexacarbonyl.

The mechanism by which the chromium hexacarbonyl is formed under the present conditions is not entirely clear, at present. It is established, however, that the essential condition for a successful synthesis is the use of a reducing agent, of a nitrogenous base in substantial concentration, and of a halogen activator.

In the synthesis described by A. Job and A. Cassal and improved by B. B. Owen et al. (supra) there is first produced (according to the authors) an intermediate compound in which chromium is bound to carbon monoxide and to other groups, and the intermediate product is hydrolyzed, resulting in the decomposition thereof with formation of the chromium hexacarbonyl.

In contrast, in our method, the chromium hexacarbonyl is formed directly in the course of the reaction, and no hydrolysis of an intermediate product is required.

The present reaction is carried out in a corrosion proof vessel which may be made of a metal or metal alloy less electropositive than the metal powder or shavings used as reducing agent so that the corrosive effects of the small amounts of acidic halogenated compounds which may be present in the reaction mixture are minimized.

The chromium hexacarbonyl can be separated from the crude reaction mixture in various ways. For instance, the reaction mixture can be diluted with water and subjected to steam-distillation to obtain a distillate in which all of the chromium hexacarbonyl is suspended as a crystalline white solid, and from which it can be recovered by filtration. The mixture in the distillation flask may be acidified in order to prevent excessive foaming.

The chromium hexacarbonyl may also be separated from the crude reaction mixture by direct sublimation thereof from the reaction mixture at a temperature of 80° C. to 110° C. under an inert gas such as nitrogen, hydrogen, or carbon monoxide. This latter separation method is particularly suitable for use in the large scale production of the chromium hexacarbonyl since, when it is used, most of the solvent and of the activator, and all the excess of the reducing metal, remain in the reactor and can be re-used immediately (after fortification by the addition of amounts of reactants corresponding to the amounts consumed) for the production of additional amounts of the chromium hexacarbonyl.

Another method of separating the chromium hexacarbonyl consists in extracting it from the reaction mixture by means of a suitable solvent which may be, for example, diethyl ether, chloroform, carbon tetrachloride, and hydrocarbon solvents of all classes.

Alternatively, it is possible to recover the chromium hexacarbonyl by filtering the reaction mixture, separating the chromium hexacarbonyl from the solid phase by sublimation, and recycling the filtered liquid phase and excess of the reducing agent to the reactor.

The synthesis of chromium hexacarbonyl by the present method can be carried out continuously by introducing the suspension or solution of the reducing agent in the liquid phase containing the chromium compound and the activator into the upper part of a reaction tower, injecting a stream of carbon monoxide or of carbon monoxide and hydrogen under presure at the bottom of the reactor, continuously withdrawing a portion of gas containing chromium hexacarbonyl from the top of the tower, separating the carbonyl by cooling, adjusting the composition of the gas, and recycling it for re-use.

In practice, in carrying out the synthesis on a commercial scale, the separation of the carbonyl from the liquid phase, recycling of the reaction liquid, etc., can be carried out continuously.

The following examples are given to illustrate specific embodiments of the invention, it being understood that these examples are not intended as limiting.

EXAMPLE 1

A solution containing 0.054 mol of trichlorotripyridin chromium per 100 g. pyridine is introduced into a shaking autoclave, in the presence of 10 g. magnesium and subjected for 7 hours to the action of a $CO-H_2$ mixture in a molar ratio 1:2, under a pressure of 280 atm. at 160° C.–170° C.

By steam distillation of the reaction product, an amount of chromium hexacarbonyl corresponding to 25% of the chromium employed is obtained.

EXAMPLE 2

16.5 g. anhydrous chromium acetate, prepared by reacting chromic anhydride with acetic anhydride are suspended in 150 g. pyridine containing 1% iodine and 2% cobalt acetate and treated with carbon monoxide for 24 hours, under 200 atm., at the temperature of 140–145° C. in the presence of 8 g. magnesium powder. By steam distillation of the reaction mixture, 8 g. chromium hexacarbonyl are obtained (yield 50%).

EXAMPLE 3

This example illustrates the batchwise preparation of chromium hexacarbonyl from chromic acetylacetonate and various reactants and activators, employing $CO-H_2$ mixtures of various compositions, or CO alone.

In all cases the reaction was carried out in a 450 cc. shaking autoclave. When the reaction was completed, the autoclave was cooled, the residual gases were removed and the reaction mixture was steam-distilled to separate the carbonyl.

The specific conditions used in these runs, and the results obtained are shown in Table I.

*Table I*

SYNTHESIS OF CHROMIUM HEXACARBONYL FROM CHROMIC ACETYLACETONATE

| chromium acetyl-acetonate, g. | Nitrogen base | | Reducing metal | | Activator | | $CO:H_2$ molar ratio | pressure at room temperat., atm. | temperature, °C. | time, hours | $Cr(CO)_t$ obtained, g. |
|---|---|---|---|---|---|---|---|---|---|---|---|
| | type | g. | type | g. | type | g. | | | | | |
| 17.5 | pyridine | 75 | zinc | 7 | iodine | 1 | 1:2 | 220 | 160 | 10 | 1.1 |
| 17.5 | do | 75 | magnesium | 2.5 | do | 1.5 | 1:5 | 230 | 150-155 | 9 | 4.4 |
| 17.5 | do | 75 | do | 4 | do | 1.5 | 1:0 | 170 | 150 | 3 | 9.1 |
| 17.0 | do | 75 | do | 4.5 | chloroform | 1.5 | 1:1.5 | 220 | 160-170 | 3 | 9.7 |
| 35 | pyridine bases with B.P. 132-155° C. | 150 | do | 9 | iodine | 1.1 | 1:1 | 205 | 160 | 6 | 11.3 |
| 17.5 | pyridine ᵃ | 80 | magnesium ᵇ | 8 | do | 1 | 1:0 | 190 | 115 | 5 | 2 |
| 17.8 | pyridine | 150 | magnesium | 5.4 | do (CuCOCl)ₙ 4) | 0.5 | 1:0 | 150 | 110 | 3 | 10 |

ᵃ 60 g. methanol were employed as diluent.
ᵇ The metal was employed in the form of shavings, while in the other ones reported in this table the metal was used in powder form.

EXAMPLE 4

140 g. chromic acetylacetonate, 4 g. iodine, 20 g. magnesium powder and 400 g. pyridine bases distilled between 132° and 155° C., are introduced into a 1710 cc. shaking autoclave.

Successively, a $CO-H_2$ mixture in a molar ratio of 10:1 is introduced into the autoclave up to a pressure of 190 atm. and the autoclave is quickly heated to 170° C. Within 6 hours the pressure decreases from 320 to 240 atm. The autoclave is then cooled to 125° C. and a portion of the gaseous phase is slowly withdrawn through a valve and passed through a cooling system in which 4 g. chromium hexacarbonyl, obtained by condensation of its vapors contained in the gaseous phase coming from the reaction vessel, are collected.

The autoclave is then cooled to room temperature. The residual gases are removed and the autoclave is connected with a wide-mouthed glass condenser. The autoclave is heated to 120° C. and a slow carbon monoxide stream is introduced from the bottom. 20 g. crystalline chromium hexacarbonyl, directly sublimed from the reactor, are thus collected in the condenser.

The pyridine bases, the chromium carbonyls and the excess of magnesium remaining in the autoclave are employed in a successive cycle.

EXAMPLE 5

18 g. chromous acetate and 6 g. magnesium powder are suspended in 150 cc. pyridine containing 1 g. elemental iodine. This mixture is treated in an autoclave for 7 hours, at 165° C., with a gas consisting of carbon monoxide and hydrogen in a molar ratio of 2:1, at a pressure of 300 atm. After cooling and removal of gases, the reaction products are suspended in 1.5 liters of water, acidified with hydrochloric acid and steam distilled. 10 g. chromium hexacarbonyl are obtained in the distillate.

EXAMPLE 6

28 g. chromic xanthogenate $(C_2H_5OCS_2)_3Cr$, 6 g. magnesium powder, 1 g. iodine and 120 g. pyridine are introduced into a 500 cc. autoclave. A $CO-H_2$ mixture with a molar ratio of 3:1 is then introduced up to a pressure of 200 atm., and the autoclave is agitated and heated to 160°. The reaction is stopped after 7 hours. The residual gases are removed and the reaction product is steam distilled. 0.9 g. chromium hexacarbonyl are obtained.

EXAMPLE 7

14 g. of a chromium-aluminum alloy, containing 36% chromium, and 0.5 g. magnesium powder are suspended in 100 cc. pyridine containing 2 g. iodine. The mixture is treated in an autoclave with carbon monoxide at 300 atm. at a temperature of 160–170° C. for 8 hours. After cooling the residual gases are removed and the reaction products are steam distilled. 1.1 g. chromium hexacarbonyl are obtained.

EXAMPLE 8

Into a 450 cc. shaking autoclave a mixture having the following composition (by weight) is introduced:

| | Percent |
|---|---|
| Chromic ethyl hexanoate | 13.2 |
| Pyridine | 82 |
| Magnesium powder | 2.7 |
| Copper chlorocarbonyl $(CuCOCl)_n$ | 1.6 |
| Iodine | 0.5 |

This mixture is treated at 130–135° C. with carbon monoxide under 180–170 atm. for 10 hours. The reaction product is steam distilled. The chromium hexacarbonyl contained in the distillate corresponds to 95% of the chromium introduced.

EXAMPLE 9

This example shows that the synthesis of $Cr(CO)_6$ can be carried out also in the presence of bases different from pyridine, that the nitrogen base can be diluted with inert solvents and that metal carbonyls or salts of metals capable of transforming into carbonyls under the reaction conditions can be employed as accelerators.

An autoclave with a capacity of 450 cc. was used. When the reaction was completed, the autoclave was cooled, the residual gases were removed and the mixture of the reaction products was recovered by washing the autoclave with the same solvent used for the synthesis.

The solution thus obtained was cooled to —40° C. and filtered. The solid mass thus separated was subjected to sublimation at 75° C. under 15 mm. Hg, thus obtaining pure chromium hexacarbonyl as compact white crystals.

The working conditions and the yields are reported in Table II.

Table II

SYNTHESIS OF CHROMIUM HEXACARBONYL FROM CHROMIC ACETYLACETONATE IN THE PRESENCE OF VARIOUS NITROGEN BASES AND DILUENTS
[Chromium acetylacetonate 25 g.; magnesium 10 g.]

| Base | Diluent | Activator and Accelerator | Temperature, °C. | Pressure at the reaction temp., atm. | Time, Hours | Yield of sublimed chromium hexacarbonyl, percent |
|---|---|---|---|---|---|---|
| Pyridine, 50 g. | diethyl ether, 70 g. | iodine, 1 g., plus dicobalt octacarbonyl, 2 g. | 120 | 230–250 | 7 | 65 |
| Do. | toluene, 100 g. | iodine, 1 g., plus nickel acetate, 2 g. | 138 | 295–255 | 5 | 80 |
| Pyridine, 18 g. | toluene, 120 g. | iodine, 0.5 g., plus ferric chloride, 2 g. | 130 | 80–45 | 20 | 78 |
| Quinoline, 120 g. | iso-octane, 30 g. | iodine, 2 g., plus dicobalt octacarbonyl, 2 g. | 135 | 275–240 | 3 | 72 |
| Tributylamine, 45 g. | toluene 85 g. | iodine, 1 g., plus dicobalt octacarbonyl, 2 g. | 140 | 160–125 | 14 | 60 |
| Triethylamine, 45 g. | do. | do. | 160 | 325–280 | 10 | 58 |
| Ammonia, 15 g. | toluene, 120 g. | do. | 140 | 200–170 | 20 | [1] 5 |

[1] The solid product, after separation according to the general method described, yields chromium hexacarbonyl only after protracted steam-distillation.

EXAMPLE 10

This example illustrates how the synthesis of chromium hexacarbonyl may be carried out at low temperature and under low pressure. A 310 cc. autoclave was used, feeding carbon monoxide in order to keep the pressure within the limits shown in Table III.

Table III

SYNTHESIS OF CHROMIUM HEXACARBONYL AT LOW PRESSURE AND TEMPERATURE
[Chromium acetylacetonate 12.5 g.; pyridine 75 g., magnesium 5 g.]

| Activator | Temperature, °C. | Pressure, Max. | Atm., Min. | Time, h. | Yield of sublimed chromium hexacarbonyl, percent |
|---|---|---|---|---|---|
| 0.5 g. iodine, plus 1 g. dicobaltoctacarbonyl | 120 | 35 | 20 | 7.30′ | 43 |
| 1 g. iodine, plus 2 g. dicobaltoctacarbonyl | 90 | 25 | 10 | 9 | 52 |

EXAMPLE 11

Into the autoclave as in Example 10, a mixture having the following composition is introduced:

| | G. |
|---|---|
| Chromium acetylacetonate | 12.5 |
| Aluminum Tyler | 20 |
| Cobalt iodide | 2 |
| Iodine | 1 |
| Mercury chloride | 1 |
| Pyrine | 75 |

Stirring is started, carbon monoxide is passed in up to a pressure of 200 atm. and the autoclave is heated to 130° C. Within 6 hours the pressure decreases from 270 to 238 atm. From the autoclave an almost completely solid mass is recovered from which, after washing with ether, 2.1 g. chromium hexacarbonyl are recovered by sublimation.

Some changes and modifications can be made in details in practicing the invention, without departing from the spirit thereof. Therefore, it is intended to include in the scope of the appended claims all such variations as may be apparent to those skilled in the art.

What is claimed is:

1. A process for the synthesis of chromium hexacarbonyl, which process comprises treating a substance selected from the group consisting of bivalent and trivalent chromium compounds with a gas comprising carbon monoxide and with a reducing agent consisting of a mixture of (a) a substance selected from the group consisting of the metals Mg, Zn and Al, the hydrides of said metals, and the alkyl hydrides of said metals with (b) an electron-donor compound selected from the group consisting of tertiary amines, pyridines and ammonia, in the presence of at least one activator selected from the group consisting of halogens, hydrocarbon halides and metal halides, and separating the resulting chromium hexacarbonyl from the crude reaction product resulting from such treatment of the starting bivalent and trivalent chromium compound.

2. The method according to claim 1, characterized in that the starting chromium compound is a chromium compound in which the chromium atom is bound to an organic oxygen-containing group.

3. The method according to claim 1, characterized in that the starting chromium compound is a chromium compound in which the chromium atom is bound to an organic nitrogen-containing group.

4. The method according to claim 1, characterized in that the starting chromium compound is a chromium compound in which the chromium atom is bound to an organic sulfur-containing group.

5. The process according to claim 1, characterized in that the electron-donor compound is selected from the group consisting of pyridine, alkyl-substituted pyridines, and tertiary aliphatic amines, and ammonia; and the activator is selected from the group consisting of elemental halogens, hydrocarbon halides, and metal chlorides, bromides and iodides.

6. The process according to claim 1, characterized in that the starting chromium compound is a chromium acetate.

7. The process according to claim 1, characterized in that the starting chromium compound is a chromium ethylhexanoate.

8. The process according to claim 1, characterized in that the starting chromium compound is a chromium acetylacetonate.

9. The process according to claim 1, characterized in that the starting chromium compound is trichloro-tripyridin-chromium.

10. The process according to claim 1, characterized in that the starting chromium compound is a chromium xanthogenate.

11. The process according to claim 1, characterized in that the reducing agent is used in an amount corresponding at least to the amount required to reduce chromium to the zero-valent state.

12. The process according to claim 1, characterized in that the activator is used in an amount between 0.1% and 10% molar, referred to the chromium.

13. The process according to claim 1, characterized in that the activator is elemental iodine.

14. The process according to claim 1, characterized in that the activator is a hydrocarbon halide.

15. The process according to claim 1, characterized in that the reaction is carried out in the presence of an organic solvent.

16. The process according to claim 1, characterized in that a supplemental activator selected from the group consisting of carbonyls of chromium, iron, cobalt and nickel is included in the reactant's mixture.

17. The process according to claim 1, characterized in that the reaction is carried out under a pressure of from 10 to 400 atm., and at a temperature between 80° C. and 200° C.

18. The process according to claim 1, characterized in that the chromium hexacarbonyl is separated from the crude reaction mixture by direct sublimation thereof from said mixture.

19. The process according to claim 1, characterized in that the chromium hexacarbonyl is separated from the crude reaction mixture by subjecting the latter to filtration and sublimating the carbonyl from the solid phase.

References Cited in the file of this patent

UNITED STATES PATENTS

| | | |
|---|---|---|
| 2,739,169 | Hagemeyer | Mar. 20, 1956 |
| 2,757,077 | Lewis et al. | July 31, 1956 |
| 2,803,525 | Brimm et al. | Aug. 20, 1957 |

UNITED STATES PATENT OFFICE
CERTIFICATE OF CORRECTION

Patent No. 2,940,832                        June 14, 1960

Giulio Natta et al.

It is hereby certified that error appears in the above numbered patent requiring correction and that the said Letters Patent should read as corrected below.

In the grant, lines 1 and 2, for "Giulio Natta, Raffaele Ercoli, and Fausto Calderazzo, of Milan, Italy," read -- Giulio Natta, Raffaele Ercoli, and Fausto Calderazzo, of Milan, Italy, assignors to Montecatini Societa Generale per l'Industria Mineraria e Chimica, of Milan, Italy, --; lines 11 and 12, for "Giulio Natta, Raffaele Ercoli, and Fausto Calderazzo, their heirs" read -- Montecatini Societa Generale per l'Industria Mineraria e Chimica, its successors --; in the heading to the printed specification, lines 4 and 5, for "Giulio Natta, Raffaele Ercoli, and Fausto Calderazzo, all of 18 Via F. Turati, Milan, Italy" read -- Giulio Natta, Raffaele Ercoli, and Fausto Calderazzo, Milan, Italy, assignors to Montecatini Societa Generale per l'Industria Mineraria e Chimica, Milan, Italy --.

Signed and sealed this 8th day of November 1960.

(SEAL)
Attest:

KARL H. AXLINE
Attesting Officer

ROBERT C. WATSON
Commissioner of Patents